United States Patent [19]

Bechtloff

[11] Patent Number: 4,565,286

[45] Date of Patent: Jan. 21, 1986

[54] SUPPORTING TUBE OF A STEEP-RISE CONVEYOR, ESPECIALLY A VERTICALLY ELEVATING CONVEYOR, OR A DOWN-FEED DEVICE

[75] Inventor: Gert Bechtloff, Hamburg, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 679,596

[22] Filed: Dec. 7, 1984

Related U.S. Application Data

[63] Continuation of Ser. No. 380,083, May 20, 1982, abandoned.

[30] Foreign Application Priority Data

May 20, 1981 [DE] Fed. Rep. of Germany ....... 3120056

[51] Int. Cl.[4] .............................................. B65G 21/10
[52] U.S. Cl. .................................. 198/861.1; 198/861
[58] Field of Search ............... 198/861, 841, 864, 512, 198/515, 516, 627, 628, 819, 823; 414/133

[56] References Cited

U.S. PATENT DOCUMENTS 3,443,677  5/1969  Tribe .................................... 198/819

Primary Examiner—Joseph E. Valenza
Assistant Examiner—Kyle E. Shane
Attorney, Agent, or Firm—Becker & Becker, Inc.

[57] ABSTRACT

A supporting tube for a conveyor which moves bulk material at a steep angle. The supporting tube has a bottom end which supports a material handling device which is non-rotatable relative to the longitudinal center line of the tube. The supporting tube is further provided with a slit, which extends the full length of the tube, and with one or more linear drive arranged on the tube for displacing the edges of the slit relative to each other.

8 Claims, 14 Drawing Figures

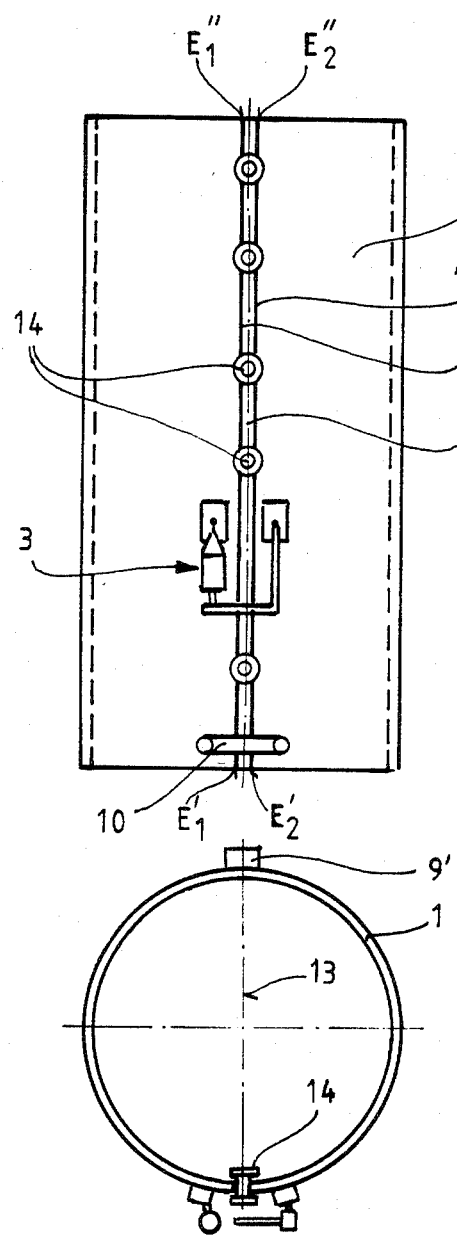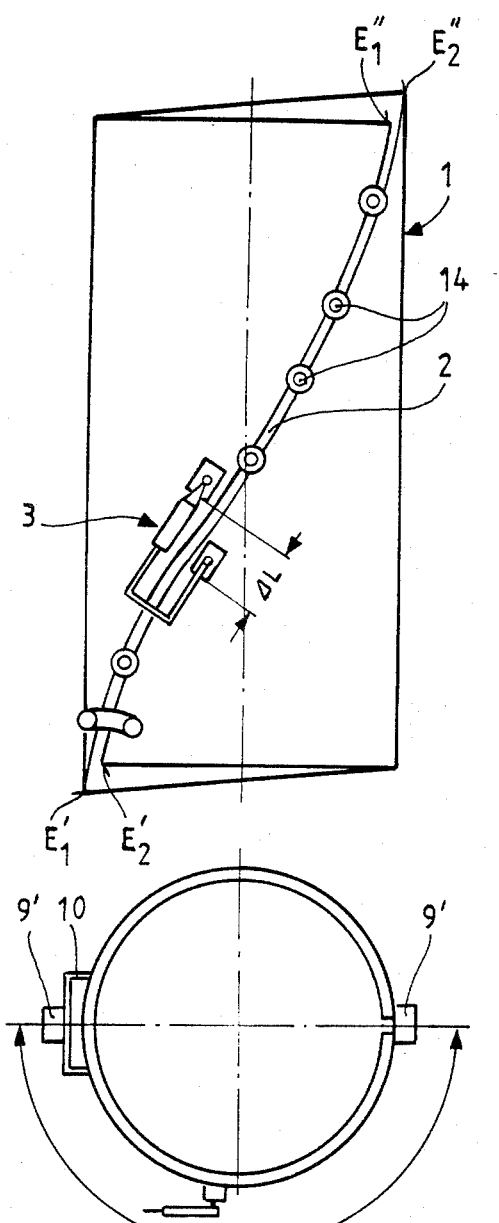

FIG-5
FIG-6
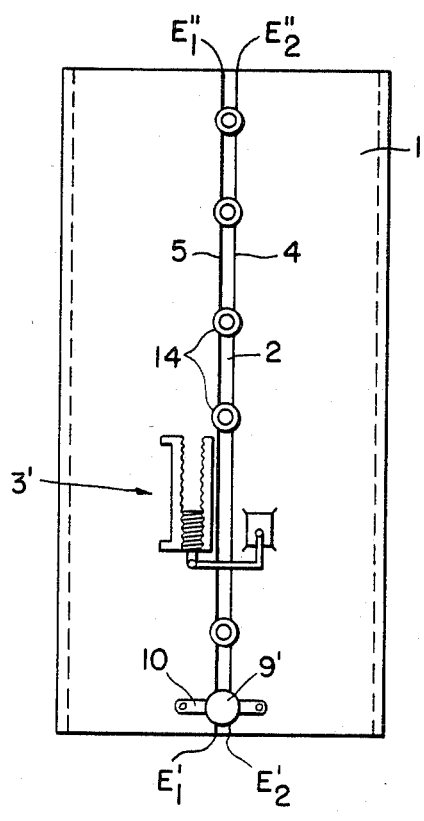
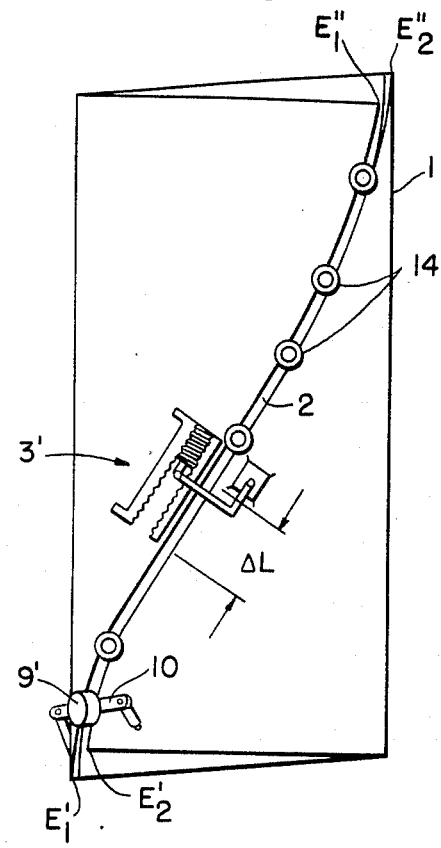
FIG-5a
FIG-6a
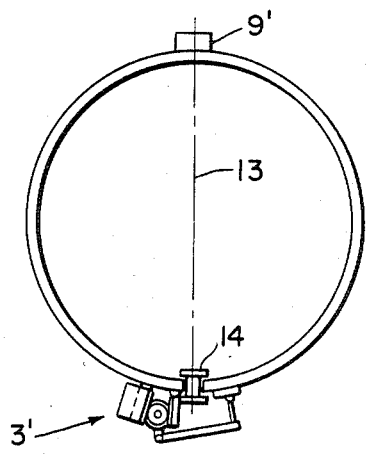
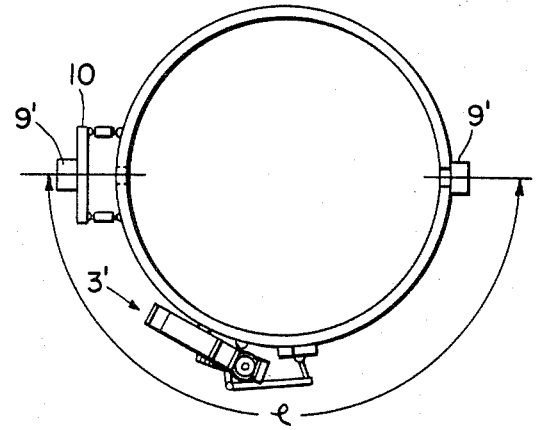

SUPPORTING TUBE OF A STEEP-RISE CONVEYOR, ESPECIALLY A VERTICALLY ELEVATING CONVEYOR, OR A DOWN-FEED DEVICE

This application is a continuation of application Ser. No. 380,083-Bechtloff, filed May 20, 1982, now abandoned.

The present invention relates to a supporting tube of a conveyor elevating bulk material at a steep angle, especially vertically, and/or delivering material in a downward direction; the bottom end of the supporting tube supports a pick-up device, and/or a discharge or distributing device for loading duty, attached non-rotatably about the longitudinal centerline of the supporting tube.

BACKGROUND OF THE INVENTION

In the case of continuous-flow bulk-handling shiploaders or bulk-handling ship-unloaders, the bulk material discharge device and/or bulk material pick-up device is/are generally arranged to swivel or turn about the vertical axis. It is known to provide a turntable for this purpose at the upper end of the supporting tube, and to turn the supporting tube about the vertical axis with the discharge and/or pick-up device. According to another proposal, the discharge and/or pick-up device is pivoted or rotated by suitable means with the supporting tube fixed. These known solutions necessitate relatively complicated revolving mechanisms and bearing structures which, in addition, increase the weight of the loader or unloader. Since, in the case of ship unloaders or ship loaders, the elevating conveyor or down-feed device is arranged at the front end of a relatively long boom, the weight increased due to the revolving mechanisms and bearing structures leads to relatively high moments, which have to be taken up or balanced on the land side by the steel structure of the loader or unloader, which also negatively affects the weight of the unit.

It is therefore an object of the present invention to provide a possibility of swivelling or turning the bulk material discharge or bulk material pick-up device that is relatively simple and increases the weight of the conveyor as little as possible.

This object, and other objects and advantages of the present invention, will appear more clearly from the following specification in connection with the accompanying drawings, in which:

BRIEF DESCRIPTION OF THE DRAWINGS

FIGS. 1 and 1a are a schematic front view and plan view of one embodiment of the supporting tube with the edges of the slit not displaced;

FIGS. 2 and 2a are a front view and plan view of the supporting tube with the edges of the slit displaced, whereby the ends of the supporting tube are displaced by the angle $\phi$ (180°);

FIGS. 5 and 5a are a schematic front view and plan view of second embodiment of the supporting tube with the edges of the slit not displaced;

FIGS. 6 and 6a are a front and plan view of the supporting tube with the edges of the slit displaced by a electric linear motor drive;

DETAILED DESCRIPTION

Figure 3:
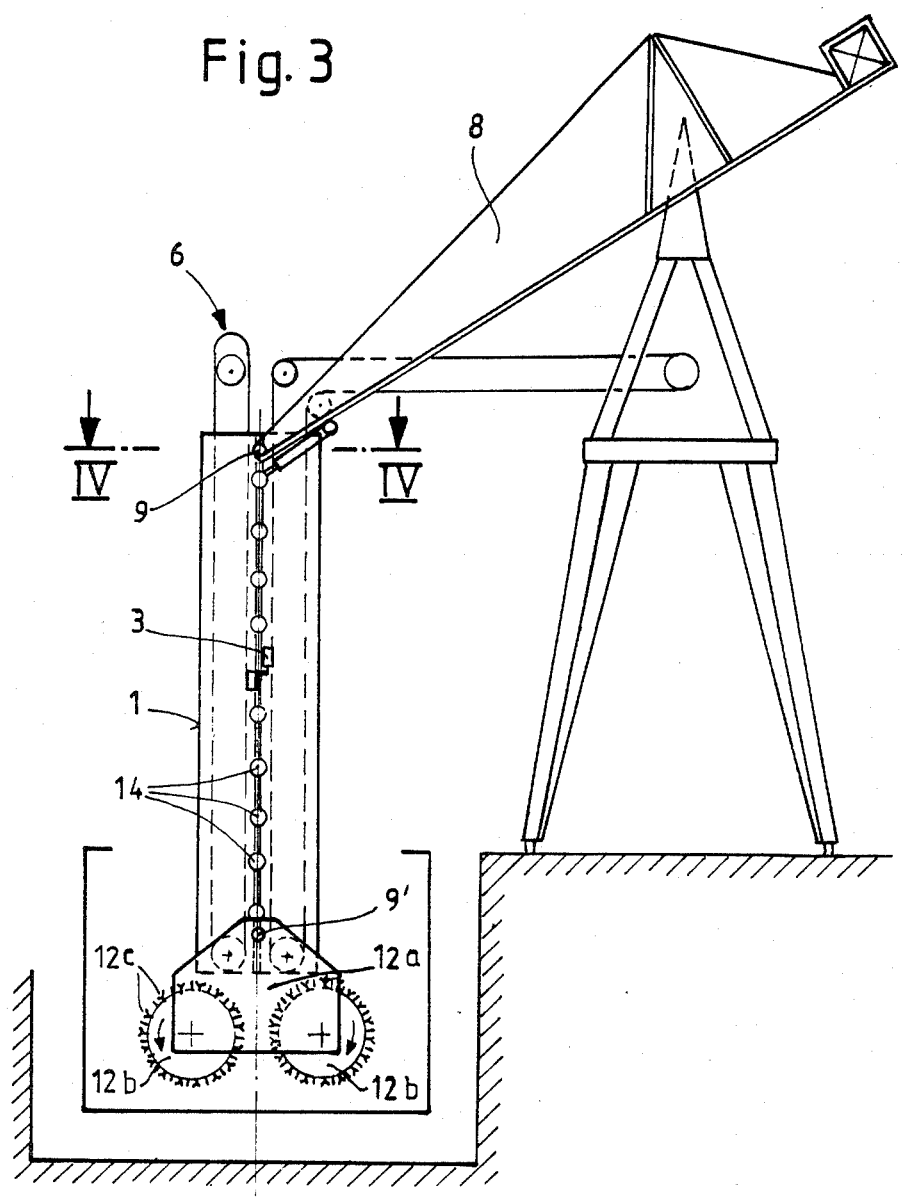
FIG. 3 is a side elevation of a ship unloader with the supporting tube.
Figure 4:
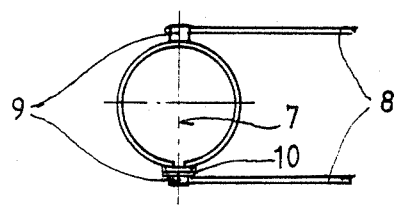
FIG. 4 is a section taken along the line IV—IV in FIG. 3.

The supporting tube of the present invention is characterized primarily in that the supporting tube is formed with a slit extending the full length of the supporting tube, and in that the edges of the slit are capable of being displaced relative to each other by means of one or more linear drives.

Due to the warping force torsion of the elastic supporting tube, the ends of the supporting tube are turned through the angle $\phi$ as the slit is displaced. The rotation is uniform over the full length of the supporting tube. The solution according to the invention avoids the need for a complicated revolving mechanism with distributing plate and a complicated supporting arrangement for the tube since it uses only a relatively simple linear drive.

According to specific embodiments of the present invention, each linear drive may be an electric linear motor drive, a hydraulic piston/cylinder drive, or a screw-and-nut drive.

Referring now to the drawings in detail, reference numeral 1 denotes the vertical supporting tube, which is made of a suitable elastic tough material, preferably steel, and which—a feature omitted in FIGS. 1 and 2—carries at its bottom end a discharge device or pick-up device of a known type—depending on whether the unit is a loader or unloader. The discharge or pick-up device is attached to the lower end of the supporting tube in a non-rotatable manner relative to the vertical axis (=longitudinal centerline of the supporting tube).

The supporting tube 1 is formed with a slit 2 which is straight, i.e. not curved, in the non-displaced condition, and which extends the full length of the supporting tube 1 in the longitudinal direction. In order that the edges 4, 5 of the slit are prevented from rubbing on each other as the displacement is effected, the slit 2 is bridgable by spacers 14 in the form of cylindrical rollers with lateral flanges.

Figure 7:
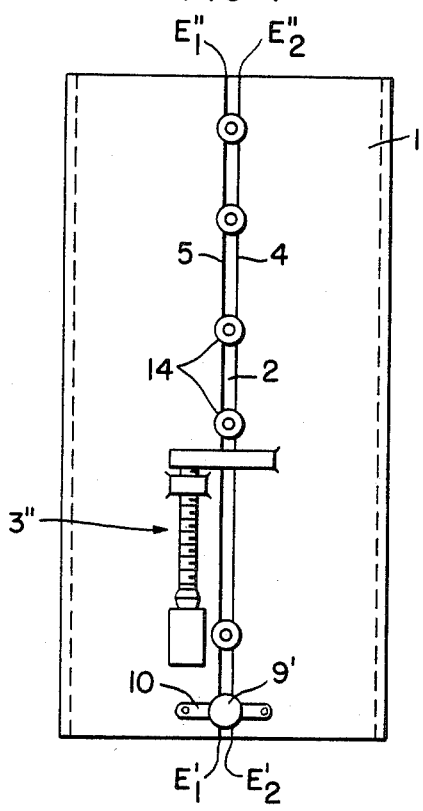
FIGS. 7 and 7a are a schematic front view of plan view of third embodiment of the supporting tube with the edges of the slit not displaced.
Figure 8:
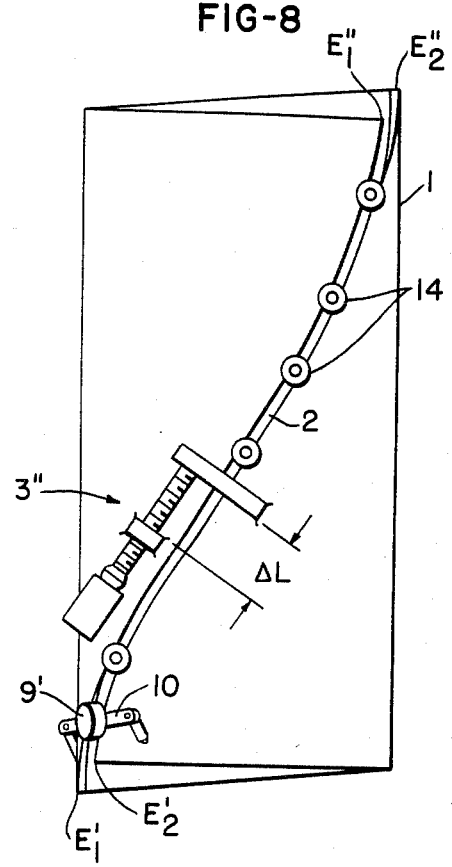
FIGS. 8 and 8a are a front and plan view of the supporting tube with the edges of the slit displaced by a screw-and-nut drive.
Figure 7A:
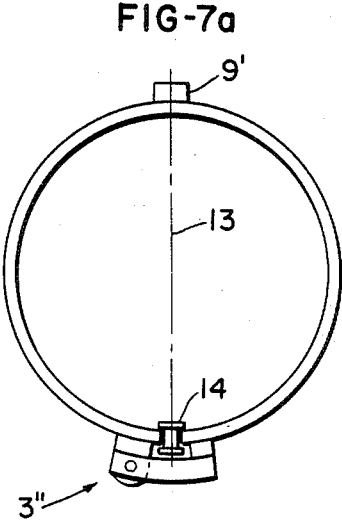
Figure 8A:
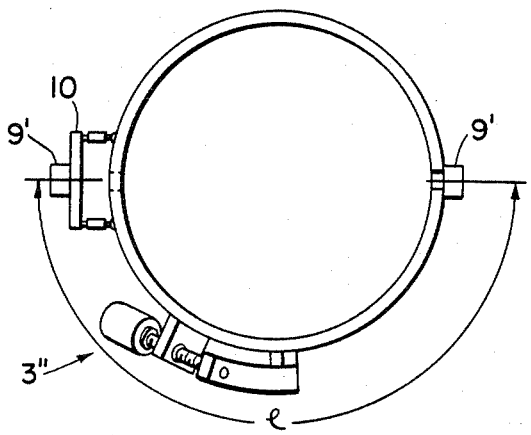

Arranged on the supporting tube 1 is a linear drive of known type in order to permit the edges 4, 5 of the slit to be displaced relative to each other. It is immaterial at what location along the longitudinal slit 2 the linear drive is mounted. The linear drive may, for instance, be an electric linear motor drive (FIGS. 5–6a), a hydraulic piston-cylinder drive (3), a screw-and-nut drive (FIGS. 7–8a), or a similar element. The linear drive may also comprise a plurality of linear drive units arranged in series and acting simultaneously.

The magnitude of the swivelling angle $\phi$—which in FIG. 2a is 180°—is dependent on the modulus of elasticity of the material of the supporting tube 1, on the wall thickness, and on the length of the supporting tube. By appropriate selection of the parameters referred to, it is possible to achieve the angle $\phi$ required for the specific application.

The cross section of the supporting tube 1 may be round, especially circular, triangular, square, rectangular, or polygonal.

The surface of the supporting tube 1 may, apart from the slit 2, be solid; but there may be relatively large cut-outs (openings) in the surface. If necessary, the supporting tube 1 may also be of lattic construction.

$E_1'$, $E_1''$ and $E_2'$, $E_2''$ denote the bottom and top corners of the slit edges 4,5. As shown in FIG. 2, a displacement by the amount $\Delta L$ of the edges 4,5 of the slit will cause a rotation (swivelling) of the ends of the supporting tube 1 by the angle $\frac{1}{8}$.

Preferred applications include land-based large-capacity bulk unloaders, especially ship unloaders, large-capacity bulk loaders, especially ship loaders, or combination units with luffing boom, at the ship end of which the steep-rise conveyor, especially a vertical elevating conveyor, or the down-feed device, is attached, each having a supporting tube 1 and a known type of elevating conveyor or a known type of down-feed device. Instead of varying the height of the steep-rise conveyor or of the down-feed device by raising and lowering the boom, other known types of solutions for varying the height of the supporting tube 1 may also be used.

The ship unloader according to FIG. 3 has a closed-belt vertical conveyor 6 of a known type arranged in the supporting tube 1. The supporting tube 1 is pivotable at its top end about a horizontal axis 7, i.e. it can be slanted from the vertical position illustrated to either side (slanting is by means of a known type of pivoting drive, e.g. a piston cylinder device). The pivoting axis 7 is situated in the extended axis of symmetry of the allied tube cross-section and is formed by two short pins 9 which are attached to a strap-like component on the supporting tube 1, and to the supporting tube 1. The pins 9 are mounted in suitable bearings on the boom 8 of the ship unloader. The strap-like component is a part 10 which bridges the slit 2 and permits displacement of the edges 4,5 of the slit, with the free ends of the part 10 being articulated to the supporting tube 1; the corresponding pin on the supporting tube 1 is connected rigidly (solidly) to the supporting tube 1 on the outside at a point opposite the part 10. The longitudinal centerlines of the pins 9 coincide with the extended axis of symmetry (horizontal axis 7) of the allied supporting tube cross section.

At the bottom end of the supporting tube 1, the material pick-up device 12 (bulk material feeder)—which in the example illustrated consists of a supporting structure 12a as well as two motor-operable thrower drums 12b having bulk material pick-up elements 12c arranged on their peripheries—is also pivotable about a horizontal axis 13 (FIG. 1a), so that the pick-up device 12 is capable of swinging out of the position shown in the drawing to the left hand or right hand side in the plane of the drawing by means of a known type of swinging device. The axis 13 is also located on the axis of symmetry of the allied supporting tube cross section, i.e. with the supporting tube 1 in a vertical position, the axis 13 is exactly below the axis 7. The axis 13—corresponding to axis 7—is formed by two pins 9' which are attached to a strap-like member on the supporting tube 1, and to the supporting tube 1. The pins 9' are supported in corresponding bearings on the supporting structure 12a. The design, location, and attachment of the pins and strap-like member are analogous to the corresponding members at the top end of the supporting tube.

The present invention is, of course, in no way restricted to the specific disclosure of the specification and drawings, but also encompasses any modifications within the scope of the appended claims.

What I claim is:

1. A supporting arrangement for bulk material handling and distribution comprising:
   a hollow supporting tube having a body including side configuration and opposite open ends;
   a conveyor mounted in said tube with at least a portion of said conveyor connected to said tube;
   means forming a slit with edges along said side configuration of said tube and extending between said opposite open ends of said tube; and
   means to cause relative rotation of said ends of said tube relative to each other by displacing one of said edges of the slit substantially parallel to the other of said edges; said relative rotation of said tube ends causing relative rotation of said one conveyor portion relative to the remaining conveyor portion.

2. An arrangement according to claim 1, which includes flanged-roller spacers located bridgable as to said slit so that said edges of the slit are prevented from rubbing against each other as the displacing thereof is effected.

3. An arrangement according to claim 2, which includes a strap-like component part that bridges the slit and permits displacement of the edges of the slit, said strap-like component part being articulated to said supporting tube.

4. An arrangement according to claim 3, in which said means to cause relative rotation of said ends of said tube relative to each other include at least one linear drive arranged on said supporting tube for displacing the edges of said slit relative to each other.

5. An arrangement according to claim 4, in which said at least one linear drive is an electric linear motor drive.

6. An arrangement according to claim 4, in which said at least one linear drive is a hydraulic piston and cylinder drive.

7. An arrangement according to claim 4, in which said at least one linear drive is a screw and nut drive.

8. An arrangement according to claim 3, in which a pin means forms a pivot axis about which one end of said supporting tube is pivoted during displacement of the edges of the slit.

* * * * *